US012559262B2

(12) United States Patent
Smythe

(10) Patent No.: US 12,559,262 B2
(45) Date of Patent: Feb. 24, 2026

(54) PREDICTION, VISUALIZATION, AND REMEDIATION OF CONJUNCTIONS BETWEEN ORBITING BODIES

(71) Applicant: Edward Charles Troppi Smythe, San Diego, CA (US)

(72) Inventor: Edward Charles Troppi Smythe, San Diego, CA (US)

( * ) Notice: Subject to any disclaimer, the term of this patent is extended or adjusted under 35 U.S.C. 154(b) by 371 days.

(21) Appl. No.: 17/940,391

(22) Filed: Sep. 8, 2022

(65) Prior Publication Data

US 2023/0084262 A1 Mar. 16, 2023

Related U.S. Application Data

(60) Provisional application No. 63/242,626, filed on Sep. 10, 2021.

(51) Int. Cl.
*B64G 3/00* (2006.01)
*B64G 1/24* (2006.01)

(52) U.S. Cl.
CPC .............. *B64G 3/00* (2013.01); *B64G 1/242* (2013.01)

(58) Field of Classification Search
CPC ..... B64G 1/24; B64G 2001/147; G01C 21/24
See application file for complete search history.

(56) References Cited

U.S. PATENT DOCUMENTS

2017/0096242 A1 * 4/2017 Alfano ..................... B64G 1/10
2020/0082248 A1 3/2020 Villegas et al.

2021/0036767 A1 * 2/2021 Devaraj ................. H04B 7/195
2021/0166572 A1 6/2021 Kim et al.
2021/0295171 A1 * 9/2021 Kamenev .............. G06N 3/088

FOREIGN PATENT DOCUMENTS

CN 113056749 A 6/2021
JP 2016057071 A * 4/2016
KR 20130022635 A 3/2013
WO WO-2021016563 A1 * 1/2021 ............. B64G 1/242

OTHER PUBLICATIONS

Creon Levit, William Marshall, "Improved orbit predictions using two-line elements", Advances in Space Research, vol. 47, Issue 7, 2011, pp. 1107-1115, ISSN 0273-1177. (Year: 2011).*

(Continued)

*Primary Examiner* — Hitesh Patel
*Assistant Examiner* — Tabitha Kress
(74) *Attorney, Agent, or Firm* — Procopio, Cory, Hargreaves & Savitch LLP

(57) ABSTRACT

The ever increasing number of orbiting bodies in low Earth orbit has made it infeasible to calculate potential conjunctions between orbiting bodies more than a few days in advance, even with the aid of supercomputers. Disclosed embodiments utilize machine learning to predict potential conjunctions between orbiting bodies faster than state-of-the art systems by orders of magnitude. This enables potential conjunctions to be identified well in advance (e.g., 30 days or more), so that they may be prioritized (e.g., for fine calculations), visualized, and remediated (e.g., via control of the impacted satellites).

19 Claims, 7 Drawing Sheets

(56) References Cited

OTHER PUBLICATIONS

Sajia Akhter, Ipshita Sarkar, Kazi Golam Rabbany, Nahid Akter, Shamim Ahkter, Yann Chemin, Dr. Honda Kiyoshi, "Adapting the LMF Temporal Splining Procedure From Serial to MPI/Linux Clusters", Journal of Computer Science, vol. 3, 2007. (Year: 2007).*

ISA/US, International Search Report in International Patent Application PCT/US22/43080, mailed Dec. 29, 2022.

Morselli Alessandro et al: "A high order method for orbital conjunctions analysis: Sensitivity to initial uncertainties", Advances in Space Research, Elsevier, Amsterdam, NL, vol. 53, No. 3, Nov. 26, 2013, pp. 490-508.

Francesco Pinto et al: "Towards Automated Satellite Conjunction Management with Bayesian Deep Learning", arxiv.org, Cornell University Library, 201 Olin Library Cornell University Ithaca, NY 14853, Dec. 23, 2020, 7 pages.

Hao Peng et al: "Improving Orbit Prediction Accuracy through Supervised Machine Learning", arxiv.org, Cornell University Library, 201 Olin Library Cornell University Ithaca, NY 14853, Jan. 15, 2018.

Reiland Nathan et al: "Assessing and minimizing collisions in satellite mega-constellations", Advances in Space Research, Elsevier, Amsterdam, NL, vol. 67, No. 11, Jan. 20, 2021, pp. 3755-3774.

European Search Report and Written Opinion mailed Jun. 17, 2025 in European Application No. 22868124.3, 10 pages.

* cited by examiner

400

<u>600</u>

START

Orbiting Bodies
of Interest
605

Identify Orbiting Bodies in Similar Window
610

Next
Orbiting Body?
620

No

END

Yes

Output
Dataset
535

Compare Paths
630

Conjunction?
640

No

Yes

Perform Remedial Action
650

FIG. 6

PREDICTION, VISUALIZATION, AND REMEDIATION OF CONJUNCTIONS BETWEEN ORBITING BODIES

CROSS-REFERENCE TO RELATED APPLICATIONS

This application claims priority to U.S. Provisional Patent App. No. 63/242,626, filed on Sep. 10, 2021, which is hereby incorporated herein by reference as if set forth in full.

BACKGROUND

Field of the Invention

The embodiments described herein are generally directed to satellite management and control, and, more particularly, to predicting conjunctions between orbiting bodies using machine learning, visualizing the predicted conjunctions, and/or initiating control of orbiting bodies based on the predicted conjunctions.

Description of the Related Art

In 2013, the number of man-made orbiting bodies, greater than 10 centimeters in dimension, in low Earth orbit (LEO) by 2020 was projected to be approximately 14,000. This number was not projected to reach 20,000 orbiting bodies until approximately 2080. However, as a result of increased scientific interest and commercial launch capabilities, which can now place objects in orbit at historically low costs, the actual number of orbiting bodies by 2020 had already exceeded 25,000. LEO mega-constellations, striving for low latency global connectivity, will add over 12,000 new LEO satellites in the next 7 years.

It goes without saying that, as the number of orbiting bodies increases, the likelihood of collisions between orbiting bodies also increases. Without mitigation, collisions are inevitable. Thus, the need for high-fidelity orbital prediction and collision warning is more important than ever.

A radar network can be used to give Space Situation Awareness (SSA) in low Earth orbit. However, there are few tools capable of predicting and visualizing orbital conjunctions. The term "conjunction" refers to two or more orbiting bodies occupying the same space at a similar time. A conjunction represents a potential collision. As the population of Earth shifts towards increased interactions with outer space, space-faring nations must be able to quickly and accurately predict and visualize conjunctions. Unfortunately, because of the computing resources required to accurately predict conjunctions, state-of-the-art systems are generally only capable of providing warnings about 3 days in advance.

SUMMARY

Accordingly, systems, methods, and non-transitory computer-readable media are disclosed for fast and accurate predictions and/or visualizations of conjunctions between orbiting bodies. Disclosed embodiments can process orbit information and predict conjunctions more quickly than state-of-the-art systems by orders of magnitude, such that warnings may be provided 30 or more days in advance. These warnings can be used to prioritize conjunctions for super fine high-fidelity conjunction calculations (e.g., requiring the usage of super-computing), and provide more time for remedial actions such as controlling one or more satellites to prevent or mitigate a collision.

In an embodiment, a method comprises using at least one hardware processor to execute a conjunction-prediction process comprising: collecting an input dataset that comprises, for each of a plurality of orbiting bodies, a historical time series of data points, wherein each data point comprises orbit information about the orbiting body at a temporal epoch; for each of the plurality of orbiting bodies, extracting a feature set based on the historical time series for that orbiting body, applying a predictive model to the extracted feature set to produce an inferred set, wherein the inferred set comprises a predicted future time series of data points, and adding the inferred set to an inferred dataset; for each inferred set in the inferred dataset, applying a gravity model to the inferred set to predict a path, and adding the predicted path to an output dataset; and, for each of one or more orbiting bodies of interest, identifying whether any of the plurality of orbiting bodies is in a similar window as the orbiting body of interest, and when any of the plurality of orbiting bodies is in the similar window, for each of the plurality of orbiting bodies that is in the similar window, comparing the predicted paths of that orbiting body and the orbiting body of interest to determine whether or not a potential conjunction occurs, and when determining that the potential conjunction occurs, performing at least one remedial action.

Each data point in the historical time series and the future time series may be in Two-Line Element (TLE) format.

The orbit information may comprise one or more of an epoch, first time derivative of mean motion, second time derivative of mean motion, B*, inclination, right ascension of ascending node, eccentricity, argument of perigee, mean anomaly, mean motion, or revolution number at the epoch.

Each data point in the historical time series and the future time series may comprise values for an identical set of fields.

The future time series may comprise at least 30 data points representing 30 consecutive days.

The predictive model may comprise a long short-term memory (LSTM) recurrent neural network (RNN).

The method may further comprise using the at least one hardware processor to: generate a training dataset that comprises, for each of the plurality of orbiting bodies, a first historical time series of data points that is labeled with a second historical time series of data points which are subsequent in time to the first historical time series, wherein each data point in the first and second historical time series comprises the orbit information about the orbiting body at a temporal epoch; and train the predictive model using the generated training dataset. Generating the training dataset may comprise removing a sampling bias in the training dataset by, for each of a plurality of sampling windows, selecting a single data point from the sampling window, and discarding all other data points in the sampling window. A size of the sampling window may be 24 hours.

The plurality of orbiting bodies may comprise all orbiting bodies greater than or equal to 2 centimeters in dimension in low Earth orbit.

The one or more orbiting bodies of interest may comprise the plurality of orbiting bodies.

The method may further comprise using the at least one hardware processor to receive an input operation, specifying the one or more orbiting bodies of interest, from a user via a graphical user interface, and wherein the at least one remedial action comprises providing a notification of the potential conjunction to the user.

A potential conjunction may be defined as a minimum separation, between the orbiting body and the orbiting body of interest, of less than a predefined distance.

The at least one remedial action may comprise initiating a calculation of a path of the orbiting body and a path of the orbiting body of interest to validate the potential conjunction, wherein the calculation is more computationally expensive than the conjunction-prediction process.

The at least one remedial action may comprise initiating control of one or both of the orbiting body or the orbiting body of interest, via communication with a satellite management system.

The at least one remedial action may comprise packaging a representation of the potential conjunction into a data object, and providing the data object to at least one downstream function. The at least one downstream function may comprise a visualization tool, wherein the method further comprises using the at least one hardware processor to execute the visualization tool to: generate a representation of the potential conjunction on a virtual map; generate a representation of the orbiting body of interest and a path between the orbiting body of interest and the potential conjunction on the virtual map; generate a representation of the orbiting body and a path between the orbiting body and the potential conjunction on the virtual map; and generate an informational frame comprising information about the potential conjunction.

The similar window may be defined by a difference in inclination within a predefined range and a difference in altitude within a predefined range.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 6 illustrates a process for using an output dataset of predicted paths to predict conjunctions between orbiting bodies, according to an embodiment.

DETAILED DESCRIPTION

In an embodiment, systems, methods, and non-transitory computer-readable media are disclosed for predicting, visualizing, and/or remediating conjunctions between orbiting bodies. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
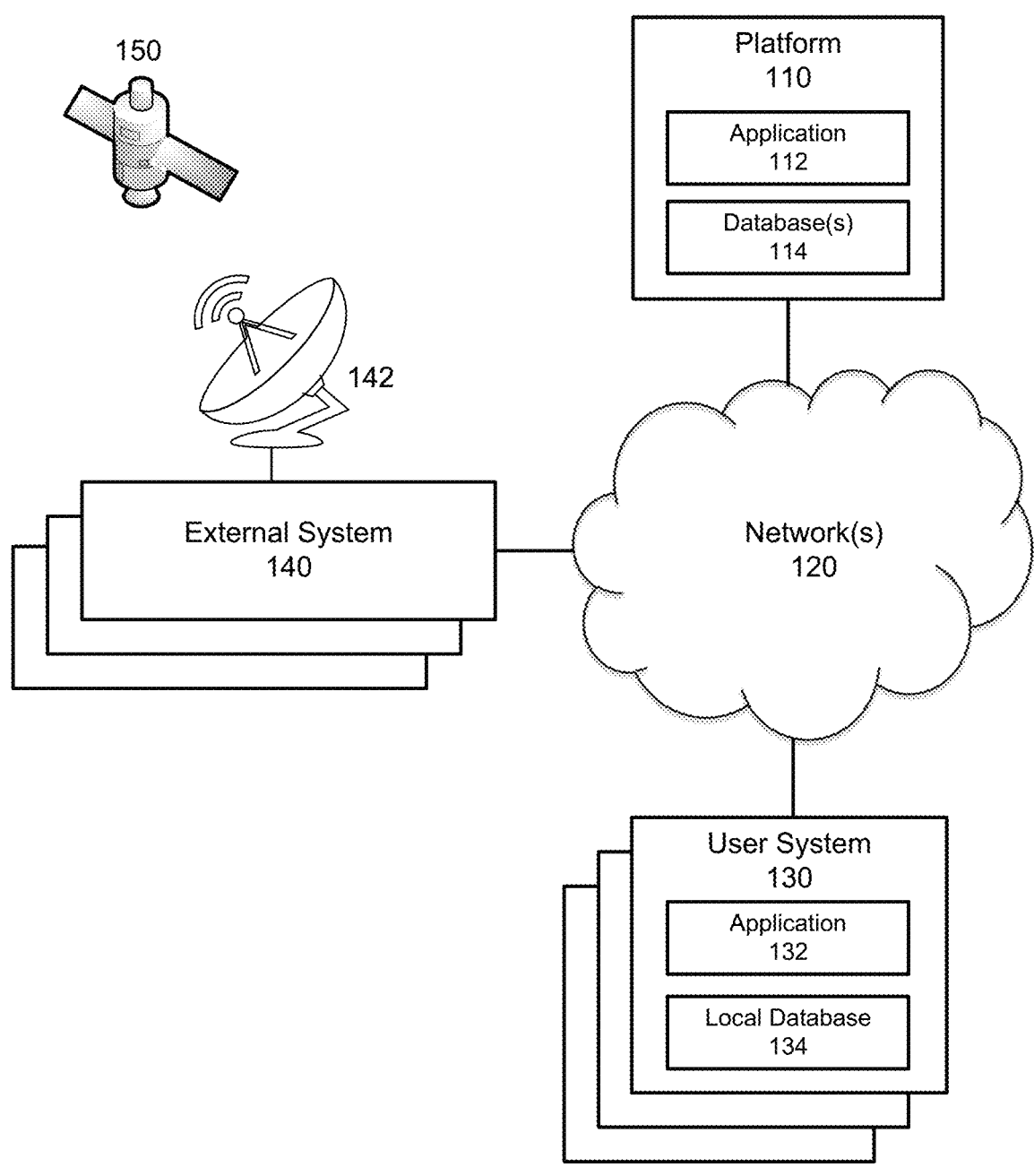
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may also comprise or be communicatively connected to a server application 112 and/or one or more databases 114. In addition, platform 110 may be communicatively connected to one or more user systems 130 via one or more networks 120 and/or one or more external systems 140 via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal computer or work station of an end user utilizing platform 110 for conjunction prediction, visualization, and/or remediation or an administrative user acting on behalf of the operator of platform 110, for example, to build, train, update, and/or otherwise manage the various models. Each user system 130 may comprise or be communicatively connected to a client application 132 and/or one or more local databases 134.

External system(s) 140 may also comprise any type or types of computing devices capable of wired and/or wireless communication. At least a subset of external system(s) 140 may comprise a satellite management system, including a satellite command and control (C2) system, capable of controlling the orbit and payload of a satellite 150. In particular, the C2 system may encode control procedures into a radio frequency (RF) link between a ground station 142 and a satellite 150. Satellite 150 may decode the control procedures from the RF link, and execute the control procedures to thereby change its orbital path, configure its payload, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation My SQL™, Oracle™ IBM™, Microsoft SQL™, Access™, PostgreSQL™, MongoDB™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In an embodiment, client application 132 may utilize a local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

1.2. Example Processing Device

Figure 2:
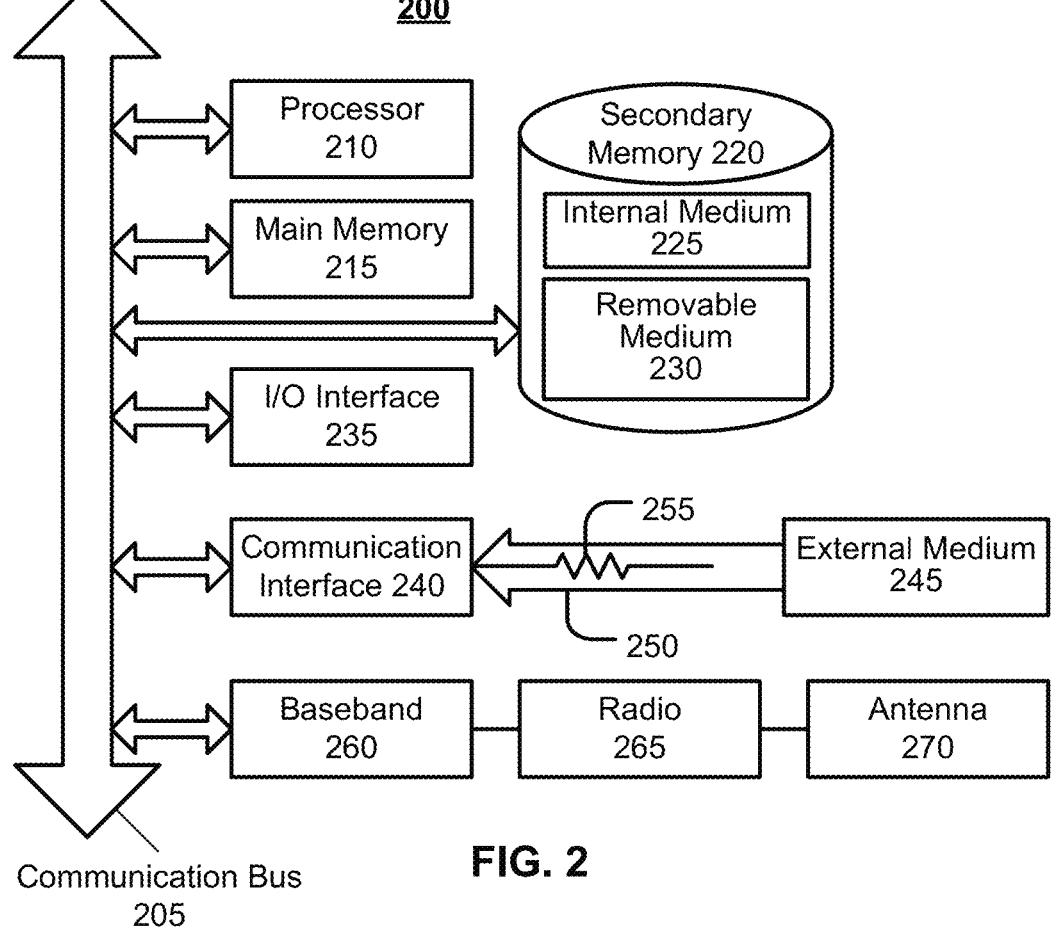
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, satellite 150, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, an Advanced Reduced Instruction Set (RISC) Machine (ARM)-based processor, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220

(including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

2. Two-Line Element Set

A predictive model is described herein as operating on input data in the two-line element (TLE) format and producing output data in the TLE format. TLE is a data format that encodes a list of orbital elements of an orbiting body for a given point in time, referred to as an "epoch." However, it should be understood that the disclosed processes are not limited to input and output data in the TLE format. Rather, the disclosed predictive model may utilize any data format, for the input and output data, that describes orbital elements of an orbiting body, including potentially future versions of the TLE format. The TLE format is simply preferred because TLE is the data format used for the data published by the North American Aerospace Defense Command (NORAD) and other tracking systems.

The current version of TLE format consists of two lines that are each sixty-nine characters long and provide the shape and orientation of the orbit of an orbiting body, forces on the orbiting body, and the position of the orbiting body on the orbit at a specific epoch. It should be understood that each TLE set, which refers to a single two-line data instance in the TLE format, represents a single orbiting body at a specific epoch. Each of the two lines in a TLE set has a plurality of fixed-width fields. Table 1 below lists the fourteen fields in the first line with their respective positions, and Table 2 below lists the ten fields in the second line with their respective positions:

TABLE 1

| Fields of First Line in TLE Format | |
|---|---|
| Column(s) | Description |
| 01 | Line number of the TLE format (e.g., 1) |
| 03-07 | Satellite catalog number |
| 08 | Classification (e.g., U: unclassified, C: classified, S: secret) |
| 10-11 | Last two digits of launch year |
| 12-14 | Launch number |
| 15-17 | Piece of the launch |
| 19-20 | Last two digits of epoch year |
| 21-32 | Day of epoch year in decimal format (including fractional portion of the day to the nanosecond) |
| 34-43 | First time derivative of mean motion (ballistic coefficient) |
| 45-52 | Second time derivative of mean motion (decimal point assumed) |
| 54-61 | B*, the drag term or radiation pressure coefficient (decimal point assumed) |
| 63 | Ephemeris type |

TABLE 1-continued

| Fields of First Line in TLE Format | |
| --- | --- |
| Column(s) | Description |
| 65-68 | Element set number |
| 69 | Checksum (modulo 10, minus sign equals 1, all other non-numbers equal 0) |

TABLE 2

| Fields of Second Line in TLE Format | |
| --- | --- |
| Column(s) | Description |
| 01 | Line number of the TLE format (e.g., 2) |
| 03-07 | Satellite catalog number |
| 09-16 | Inclination (degrees) |
| 18-25 | Right ascension of the ascending node (degrees) |
| 27-33 | Eccentricity (decimal point assumed) |
| 35-42 | Argument of perigee (degrees) |
| 44-51 | Mean anomaly (degrees) |
| 53-63 | Mean motion (revolutions per day) |
| 64-68 | Revolution number at epoch (revolutions) |
| 69 | Checksum (modulo 10) |

The satellite catalog number is assigned to an orbiting body by U.S. Space Command (USSPACECOM). The classification is a security level that has been assigned to the orbiting body. The launch year is the year that the orbiting body was launched, and the launch number is the sequential launch number for the orbiting body in that launch year. The piece of launch is a designator for each part of the launch that remains in orbit. The first derivative of mean motion is represented as the first derivative divided by two, in units of revolutions-per-day-squared. The second derivative of mean motion is represented as the second derivative divided by six, in units of revolutions-per-day-cubed. The B* drag term is used for the Simplified General Perturbations (SGP) propagator and estimates the effect of atmospheric drag on the motion of the orbiting body. The ephemeris type indicates the orbit model used by USSPACECOM. The element set number is incremented whenever a new TLE set is generated for the same orbiting body (i.e., having the same satellite catalog number). The inclination is the angle of the orbit plane of the orbiting body measured from the Earth's equatorial plane. The right ascension of the ascending node is the geocentric right ascension of the orbiting body as it intersects the Earth's equatorial plane traveling northward. The eccentricity of the orbiting body is the ratio of the orbit's focus distance to the orbit's semi-major axis. The argument of perigee is the angle within the orbit plane of the orbiting body that is measured from the ascending node to the perigee point (i.e., the point in orbit at which the orbiting body is nearest to Earth) along the direction of travel of the orbiting body. The mean anomaly is the location of the orbiting body at the epoch. The mean motion is the number of orbits that the orbiting body has completed in a 24-hour period. The revolution number at epoch is the number of revolutions around Earth that the orbiting body has completed since launch.

3. Process Overview

Embodiments of processes for fast and accurate predictions, visualizations, and remediations of conjunctions between orbiting bodies will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

3.1. Training

Figure 3:
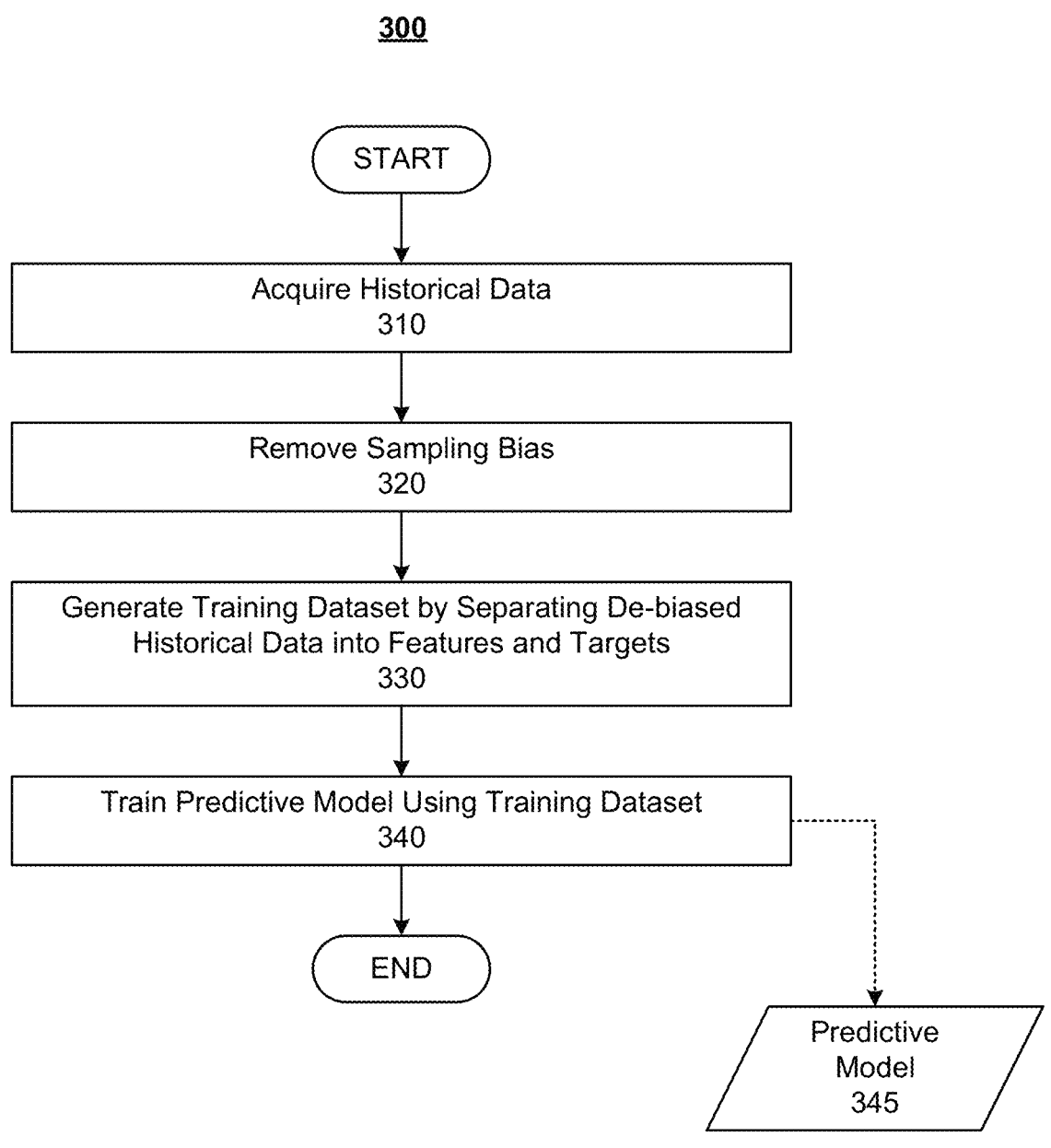
FIG. 3 illustrates a process for training a predictive model to be used for conjunction prediction, according to an embodiment.

FIG. 3 illustrates a process 300 for training a predictive model 345 to be used for conjunction prediction, according to an embodiment. Process 300 may be executed by platform 110 as a module of server application 112 and/or by user system 130 as a module of client application 132. Process 300 may be performed initially to train predictive model 345, and then subsequently to retrain predictive model 345 over time.

In subprocess 310, historical data are acquired. The historical data may comprise orbit information for a plurality of orbiting bodies. In particular, the historical data may comprise TLE sets for all orbiting bodies or a subset of orbiting bodies in low Earth orbit. This historical data may be acquired, for example, from the publications of TLE sets by NORAD or from other available sources (e.g., celestrak- .com, space-track.org, etc.). The historical data may comprise a separate file for each orbiting body, with each file comprising a time series of TLE sets as data points. However, the particular source and format of the data is not a requirement of any embodiment.

Each orbiting body follows a pattern. Even when intentional maneuvers adjust the position of a satellite, past observations can be used to predict the pattern for most individual fields in a data point (e.g., TLE set). Thus, the data point may deconstructed to understand the pattern or profile of each field. However, sampling bias can obscure these patterns. In particular, the time series of data points that are published for a given orbiting body may represent a non-uniform distribution of epochs. In this case, there will be a bias towards time periods with higher sampling rates (i.e., a denser distribution of epochs), relative to time periods with lower sampling rates (i.e., a sparser distribution of epochs).

Thus, in subprocess 320, sampling bias is removed from the historical data that were acquired in subprocess 310. For example, the time series of data points may be condensed to one data point (e.g., TLE set) per sampling window (e.g., one day or other 24-hour period, one hour, a predefined number of hours, or any other fixed time period) per orbiting body. In an embodiment, for each orbiting body, the first data point from each sampling window (e.g., the first data point per day) is used for the training dataset, and all other data points for each sampling window are discarded. This has two positive effects on the final predictive model 345. Firstly, changes in orbiting bodies that undergo significant movements over a time period (e.g., when the International Space Station (ISS) receives a new module) will be smoothed out over that time period, since only one data point is used per sampling window. Secondly, it removes many transitional data points from time periods that include large permanent orbital adjustments. However, it should be understood that this is simply one example, and that the sampling bias may be removed by any other technique that produces a substantially uniform distribution of data points within the time series for an orbiting body. After removing the sampling bias, the true pattern in the historical data can be revealed.

Notably, even with the sampling bias removed, the historical data will still produce a strong training dataset. In particular, gravity and object mass remain constant. Thus, while the orbit position may change for a given orbiting body, the orbiting body will follow similar patterns, albeit with a different baseline. This factor may be addressed by the use of short-term memory in a long short-term memory (LSTM) recurrent neural network (RNN) of predictive model 345. The LSTM feature of predictive model 345 ensures that the RNN will prioritize more recent patterns over older patterns. A predictive model 345, comprising an LSTM RNN, can rapidly predict conjunctions of orbiting bodies with sufficient accuracy to prioritize a conjunction analysis.

In an embodiment, the remaining data points in the historical data may all be normalized to the same time in each sampling window. For example, the data points may be normalized to 12:00:00 AM UTC for every 24-hour period. This normalization may be performed using a gravity model (e.g., SGP models), which is described in greater detail elsewhere herein, to determine the position of each orbiting body at a particular time, given that orbiting body's known position at an epoch provided in the closest one or more data points (e.g., TLE sets).

In subprocess 330, the training dataset is generated from the historical data, as de-biased in subprocess 320, and potentially normalized. In particular, one or more labeled feature sets may be generated from each time series of data points (e.g., TLE sets) for a given orbiting body. A feature set may be generated by parsing the historical data to extract one or a plurality of fields from one or a plurality of the data points for a single orbiting body (e.g., TLE sets with the same satellite catalog number). As examples, each feature set may comprise a time series of data points representing two years of epochs (e.g., 730 data points with one data point per day), 225 epochs (e.g., 225 data points with one data point per day), or any other number of epochs. It should be understood that any number of data points or epochs may be used for the feature set.

Each feature set may be labeled with one or more targets. Each target may comprise the same one or a plurality of fields as the feature set, but at a predefined time interval after the last epoch in the feature set. In an embodiment, a target is generated for each of a plurality of epochs. As an example, a target may be generated for an epoch of one day after the last historical epoch in the feature set, an epoch of two days after the last historical epoch, an epoch of three days after the last historical epoch, and so on and so forth up to an epoch of N days after the last historical epoch. In this case, each feature set is labeled with a target for each of N days following the last epoch of the feature set. In an embodiment, N=30 days or one month. As an example, if there are 60 days of data points in the historical data for a given orbiting body and N=30, a feature set may be derived from the first 30 days of data points, and a target may be derived from each of the last 30 days of data points to produce 30 targets. More generally, the training dataset may be generated by, for each orbiting body, splitting the historical time series of data points into a first historical time series, to be used as a feature set, and a second historical time series, which is subsequent in time to the first historical time series, to be used as the target.

In an embodiment, each feature set and each target comprises the following fields: satellite catalog number, last two digits of epoch year, day of epoch year, first time derivative of mean motion, second time derivative of mean motion, B*, inclination, right ascension of the ascending node, eccentricity, argument of perigee, mean anomaly, mean motion, and/or revolution number at epoch. However, it should be understood that this is just an example of the fields that may be used, and that alternative embodiments may utilize fewer, more, or a different combination of fields. Additionally or alternatively, the features could comprise metrics derived from multiple data points (e.g., a rate of change of a field over a plurality of data points) and/or from external factors, such as solar winds at the epoch of each data point (e.g., which may be obtained from an external system 140, such as a system of the Space Weather Prediction Center).

In subprocess 340, predictive model 345 is trained using the training dataset that was generated in subprocess 330. In an embodiment, predictive model 345 is an LSTM RNN. Predictive model 345 is trained to predict N epochs of inferred data points from an input set of historical data points. In other words, predictive model 345 predicts a future time series of N epochs based on each historical time series for a given orbiting body. In an embodiment in which the data points are TLE sets, predictive model 345 will accept a set of one or a plurality of TLE sets (e.g., a historical time series of TLE sets) as input, and output N inferred TLE sets representing a prediction for each of N days (e.g., a future time series of TLE sets). It should be understood that the inferred TLE sets may each comprise the same fields as the input TLE sets. In addition, the classification field of the first line of each inferred TLE set may be set to "P" to indicate that the inferred TLE set is a prediction, so that the inferred TLE set will not be confused with a historical TLE set. Once trained, predictive model 345 may be deployed for use in a process for predicting conjunctions.

In a particular implementation, predictive model 345 was trained with a training time of each of 150 training epochs, 1,000 training epochs, 5,000 training epochs, 7,000 training epochs, and 10,000 training epochs. These training epochs represent iterations of training and should not be confused with a temporal epoch representing a point in time in orbit information of an orbiting body (e.g., in a TLE set). In the end, 7,100 training epochs were used for the final predictive model 345. This provided a loss value at or below e-04, and acceptably balanced loss minimization with training time. For example, the root mean square error (RMSE) for eccentricity was 1.210e-05. The batch and unit value tuning were conducted with a value of 30, the size of the training dataset, and a variable value. The variable value was generated by taking the difference in days between minimum and maximum predicted values for a given target. The final predictive model 345 used a batch size equal to the size of the training dataset and a unit equal to 30.

The entire feature set for an orbiting body (e.g., a plurality of fields from each of one or a plurality of data points) may be used to train a single LSTM RNN or other prediction model to predict an entire inferred set of fields for the orbiting body. For ease of description, it is generally assumed that predictive model 345 is trained and operated in this manner. However, in an alternative embodiment, each feature set may comprise a separate feature vector for each of the plurality of fields from the one or plurality of data points, labeled with a target vector for that field. For example, a first feature vector may comprise a time series of values for eccentricity, labeled with a target vector of values for eccentricity, a second feature vector may comprise a time series of values for inclination, labeled with a target vector of values for inclination, and so on and so forth. In this case, each feature vector may comprise a historical time series of values for a single field, labeled with a future time series of values for that single field, and be used to train a separate LSTM RNN or other prediction model to predict an inferred future time series of values for that single field. Thus, predictive model 345 may comprise a plurality of LSTM RNNs or other prediction models that each predict a future time series for a different field. During operation, the predicted future time series for each field may be combined with the predicted future time series for all other fields into an inferred set (e.g., inferred TLE set) comprising a future time series of data points that each comprise values for all fields.

3.2. Operation

Figure 4:
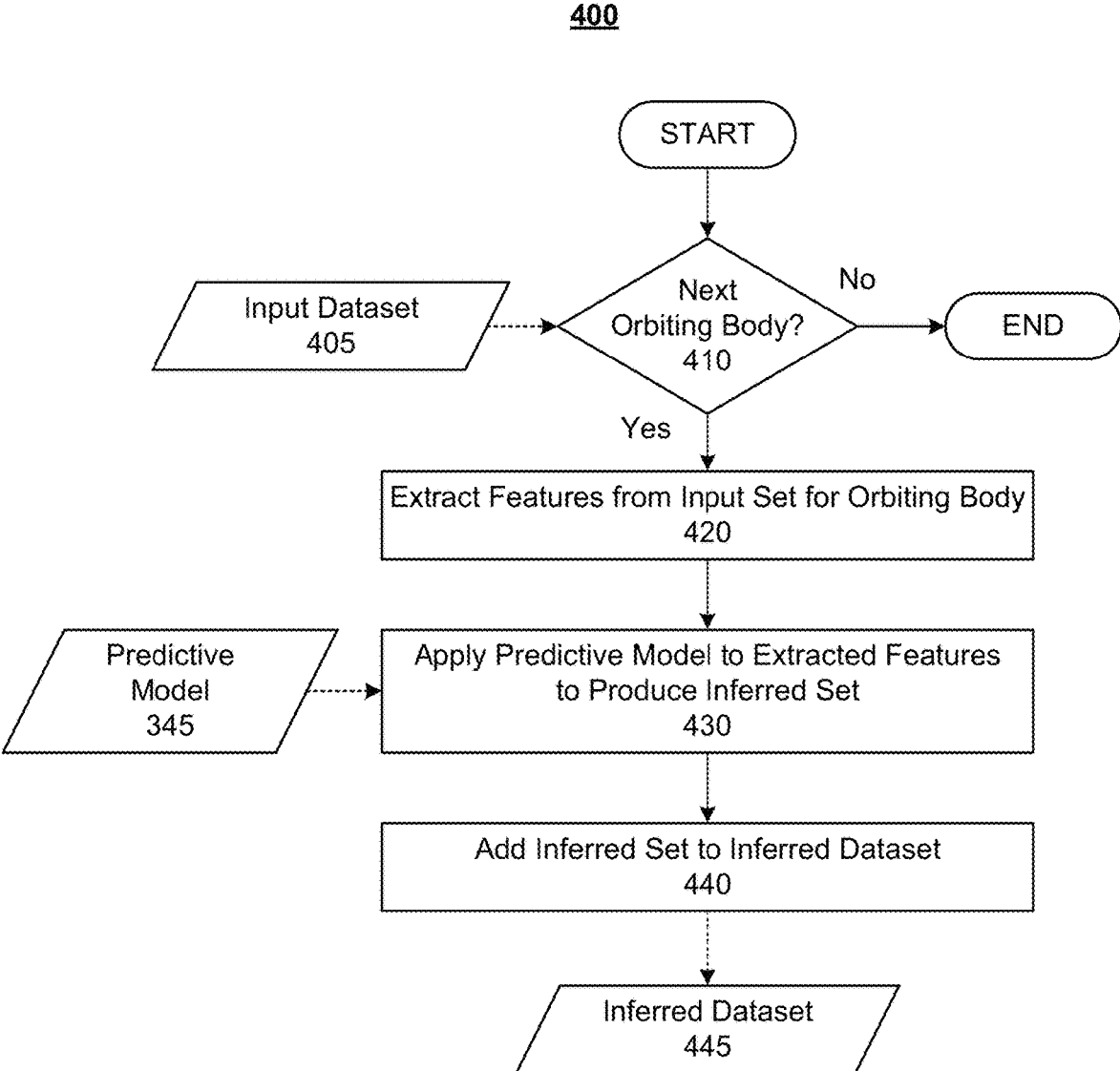
FIG. 4 illustrates a process for using a predictive model to infer a future time series of data points for a plurality of orbiting bodies, according to an embodiment.

FIG. 4 illustrates a process 400 for using a predictive model 345 to infer a future time series of data points for a plurality of orbiting bodies, according to an embodiment. It is generally contemplated that process 400 would be executed by platform 110 as a module of server application 112. However, alternatively, process 400 could be executed by user system 130 as a module of client application 132.

Initially, an input dataset 405 is obtained. Input dataset 405 may be received from one or a plurality of external systems 140. For example, server application 112 may retrieve or "pull" at least a portion of input dataset 405 from an external system 140 via an API of the external system

140. Alternatively or additionally, at least a portion of input dataset 405 may be "pushed" by an external system 140 to server application 112 via an API of platform 110. Regardless of the particular method of collection, input dataset 405 may be continually or periodically updated as new data become available.

In an embodiment, input dataset 405 comprises historical TLE sets for every orbiting body that is being tracked in low Earth orbit. However, it should be understood that TLE sets are used because TLE is the standard format used for tracking orbiting bodies in low Earth orbit, and is compatible with many available analytical tools. If the standard format were to change or another format became more ubiquitous, the disclosed embodiments may be easily adapted to a new format, with minor modifications to how the features are extracted or which features are used. In all other respects, the disclosed processes may remain the same.

In an embodiment, process 400 is executed periodically to process whatever data are present in input dataset 405 at the time. For instance, process 400 may be executed daily at the same time each day to build an inferred dataset 445 that can be used to predict conjunctions for one or more time intervals within a future time window. As an example, these time intervals may be one day and the future time window may be 30 days. In this case, each inferred dataset 445 that is output by an execution of process 400 may comprise a data point (e.g., inferred TLE set) for each orbiting body and for each of the 30 days in the future time window. In other words, each execution of process 400 produces 30 days' worth of future data points. It should be understood that, in this example where the time intervals match the periodicity of process 400, the future time window will slide by one day with each execution of process 400.

Subprocess 410 iterates through each orbiting body represented in input dataset 405. In an embodiment in which input dataset 405 comprises TLE sets or other data points that include a unique identifier for each orbiting body, subprocess 410 may iterate through each orbiting body by iterating through each of the unique identifiers. If another orbiting body remains to be considered (i.e., "Yes" in subprocess 410), process 400 proceeds to subprocess 420. Otherwise, if all orbiting bodies have been considered (i.e., "No" in subprocess 410), process 400 may end.

In subprocess 420, a feature set is extracted from an input set of data points within input dataset 405 for the current orbiting body under consideration. For example, all data points associated with the current orbiting body may be identified based on a unique identifier of that orbiting body within the data points (e.g., the satellite catalog number in a TLE set). All data points for the current orbiting body may be extracted in chronological order of epoch, to form a time series of data points. As discussed with respect to subprocess 320, sampling bias may be removed, if present. For example, in the event that there are multiple data points per sampling window (e.g., one 24-hour period), the chronologically first data point per sampling window may be kept, whereas all subsequent data points within the same sampling window may be ignored or discarded. The resulting time series may comprise the same number of data points and epochs as the number in the feature sets in the training dataset that was used to train predictive model 345. In addition, the same features that were used in the feature sets in the training dataset are extracted from each data point in the time series to produce the feature set for the current orbiting body. For example, the features may comprise fields from each data point (e.g., a plurality of fields of the TLE format, as discussed elsewhere herein). Additionally or alternatively, the features could comprise metrics derived from multiple data points and/or from external factors (e.g., solar winds).

In an embodiment, the data points in input dataset 405 may all be normalized to the same time in each sampling window. For example, the data points may be normalized to 12:00:00 AM UTC for every 24-hour period. This normalization may be performed using a gravity model (e.g., SGP models), which is described in greater detail elsewhere herein, to determine the position of each orbiting body at a particular time, given that orbiting body's known position at an epoch provided in the closest one or more data points (e.g., TLE sets). Notably, this normalization process may not be necessary if input dataset 405 is produced from data points that are published for standard time intervals (e.g., a data point is published for the same epoch every day for every orbiting body).

In subprocess 430, predictive model 345 is applied to the feature set, extracted in subprocess 420, to produce an inferred set. As discussed elsewhere herein, the inferred set may comprise an inferred data point for each of N time intervals (e.g., N=30) within a future time window. In the event that input dataset 405 comprises TLE sets, the inferred set may be an inferred TLE set that comprises all or a subset of the fields of the TLE format in the same two-line format. It is assumed that predictive model 345 has been trained by process 300. However, in an alternative embodiment, predictive model 345 could be trained in a different manner.

Predictive model 345 may comprise a single LSTM RNN (or other type of prediction model) that is applied to the entire feature set for an orbiting body (e.g., a plurality of fields from each of one or a plurality of data points) to predict an entire inferred set (e.g., a plurality of fields for each of one or a plurality of data points). Alternatively, as discussed elsewhere herein, predictive model 345 may comprise a plurality of LSTM RNNs that are each applied to a feature vector comprising a time series of values for a single field in the feature set to predict a future time series of values for that field. In this case, the predicted future time series for each field, output by each LSTM RNN, may be combined with the predicted future time series for all other fields, output by the other LSTM RNNs, into an inferred set (e.g., inferred TLE set) comprising a future time series of data points that each comprise values for all fields.

In subprocess 440, the inferred set, output by predictive model 345, is added to an inferred dataset. Inferred dataset 445 may be similar to input dataset 405 in that it will contain data points for every orbiting body. However, whereas input dataset 405 may comprise a large number of historical data points for each orbiting body, inferred dataset 445 will contain N future data points for each orbiting body.

Figure 5:
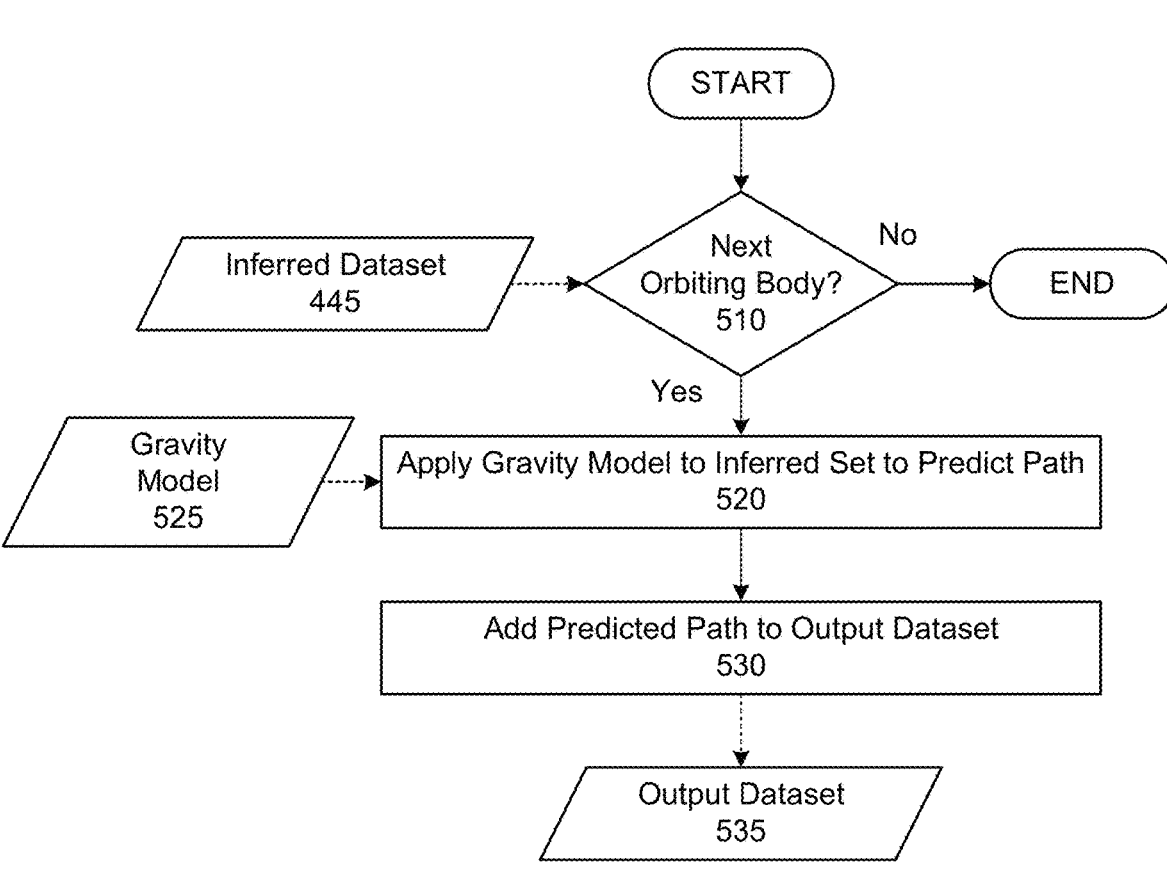
FIG. 5 illustrates a process for using an inferred dataset to predict the paths of orbiting bodies represented in inferred dataset, according to an embodiment.

FIG. 5 illustrates a process 500 for using inferred dataset 445 to predict the paths of orbiting bodies represented in inferred dataset 445, according to an embodiment. It is generally contemplated that process 500 would be executed by platform 110 as a module of server application 112. However, alternatively, process 500 could be executed by user system 130 as a module of client application 132.

Initially, an inferred dataset 445 is obtained. It is assumed that inferred dataset 445 has been derived by process 400. Process 500 may be executed by the same platform 110 as process 400. Process 500 may be triggered by the end of process 400, may be executed concurrently with process 400 to process inferred sets for orbiting bodies as they are added to inferred dataset 445, or may be executed periodically after process 400 to process the inferred dataset 445 produced by process 400. In an alternative embodiment, inferred dataset

445 may be derived in some other manner than by process 400, or process 400 may be executed on a different platform 110 than process 500 or on a user system 130, in which case inferred dataset 445 may be transmitted by process 400 to process 500 (e.g., via an API).

Subprocess 510 iterates through each orbiting body represented in inferred dataset 445. In an embodiment in which inferred dataset 445 comprises inferred TLE sets or other data points that include a unique identifier for each orbiting body, subprocess 510 may iterate through each orbiting body by iterating through each of the unique identifiers. If another orbiting body remains to be considered (i.e., "Yes" in subprocess 510), process 500 proceeds to subprocess 520. Otherwise, if all orbiting bodies have been considered (i.e., "No" in subprocess 510), process 500 may end.

In subprocess 520, a gravity model 525 is applied to the inferred set in inferred dataset 445 for the current orbiting body under consideration, to predict the path of the current orbiting body. In particular, for each inferred data point (e.g., inferred TLE set) in the inferred set, gravity model 525 may be used to compute the orbit position and velocity of the current orbiting body at one or more time intervals subsequent and/or prior to the epoch of that data point. For example, in an embodiment in which each inferred set comprises a future time series of data points for N days, gravity model 525 may be used to compute the orbit position (e.g., as three-dimensional coordinates) and velocity of the current orbiting body for one or more intervals (e.g., every second, every minute, every hour, etc.) between successive data points. In this manner, a path may be calculated between each of the data points, producing a predicted path of the current orbiting body for a future time window of N days. The predicted path may be represented as a time series of orbit positions at each interval (e.g., second), or a nominal orbit equation that is based on a poly-fit line for the interval-incremented orbit positions.

Gravity model 525 may be any suitable model of Earth's gravity. In an embodiment, gravity model 525 comprises one or more of the SGP models, including the SGP4 model for orbiting bodies in low Earth orbit. The SGP models are a set of five mathematical models—SGP, SGP4, Simplified Deep-Space Perturbations (SDP) 4, SGP8, and SDP8—used to calculate orbital state vectors of orbiting bodies relative to the Earth-centered inertial coordinate system.

Notably, the disclosed embodiments could be adapted for orbiting bodies around any celestial body by simply replacing gravity model 525 with an appropriate model of the celestial body and using relevant historical data for training. Thus, for example, the disclosed embodiments could be used to predict conjunctions for orbiting bodies in Lunar and/or Martian orbits. This may enhance space domain awareness as those orbits experience increased utilization. In addition, while primarily discussed with respect to orbiting bodies in low Earth orbit, defined as a geocentric orbit with an altitude below 2,000 kilometers (1,200 miles), the disclosed embodiments may be applied to orbiting bodies in any orbit, including medium Earth orbit (MEO), defined as a geocentric orbit ranging in altitude from 2,000 kilometers (1,200 miles) to just below geosynchronous orbit at an altitude of 35,786 kilometers (22,236 miles), and high Earth orbit (HEO), defined as a geocentric orbit above the altitude of geosynchronous orbit.

In subprocess 530, the predicted path, output by subprocess 520, may be added to an output dataset 535. In other words, output dataset 525 aggregates the predicted paths for all of the orbiting bodies.

FIG. 6 illustrates a process 600 for using output dataset 535 to predict conjunctions between orbiting bodies, according to an embodiment. It is generally contemplated that process 600 would be executed by platform 110 as a module of server application 112. However, alternatively, process 600 could be executed by user system 130 as a module of client application 132.

Initially, an output dataset 535 is obtained. It is assumed that output dataset 535 has been derived by process 500. Process 600 may be executed by the same platform 110 as process 500. Process 600 may be triggered by the end of process 500, or may be executed periodically after process 500 to process the output dataset 535 produced by process 500. In an alternative embodiment, output dataset 535 may be derived in some other manner than by process 500, or process 500 may be executed on a different platform 110 than process 600 or on a user system 130, in which case output dataset 535 may be transmitted by process 500 to process 600 (e.g., via an API).

In addition, a set of one or more orbiting bodies of interest 605 is obtained. Orbiting bodies of interest 605 could encompass all orbiting bodies represented in output dataset 535. However, in an embodiment, orbiting bodies of interest 605 consists of a subset of the orbiting bodies represented in output dataset 535. For example, one or more users may utilize a graphical user interface of platform 110 to specify orbiting bodies of interest 605 by selecting one or more orbiting bodies for which they are responsible or in which they are otherwise interested. In particular, a user may register a user account on platform 110, and utilize a graphical user interface, specific to the user account, to subscribe to receive conjunction predictions for one or more orbiting bodies (e.g., by inputting or selecting the satellite catalog number or other identifier for each orbiting body into the graphical user interface). It should be understood that a plurality of users may establish user accounts and subscribe to conjunction predictions in this manner. Process 600 may be executed for each individual user, in which case orbiting bodies of interest 605 consists of only the orbiting bodies to which the user subscribed, or may be executed for a plurality of users, in which case orbiting bodies of interest 605 may comprise all of the orbiting bodies to which the plurality of users have subscribed or may comprise all orbiting bodies in general. It should be understood that the users could be individuals, companies, government agencies, enthusiasts, or any other entity involved in the space industry.

In subprocess 610, orbiting bodies are identified, from among all orbiting bodies being tracked, that are in a similar window as orbiting bodies of interest 605. A similar window may comprise an inclination within a predefined range around the inclination of an orbiting body of interest 605 and an altitude within a predefined range around the altitude of the orbiting body of interest 605. In an alternative embodiment, a user could specify a window (e.g., by a range of inclination and a range of altitude) or orbital region, instead of orbiting bodies of interest 605. In this case, subprocess 610 would identify the orbiting bodies, from among all orbiting bodies being tracked, whose paths intersect the specified window or orbital region. In either case, a brute force search may be used to find orbiting bodies with similar windows as orbiting bodies of interest 605. Alternatively, a different or more efficient type of search may be used to find orbiting bodies with similar windows as orbiting bodies of interest 605.

Subprocess 620 iterates through each orbiting body identified in subprocess 610. As discussed above, these identified orbiting bodies are in a similar window as an orbiting body of interest 605, and therefore, are candidates for experiencing a conjunction with an orbiting body of interest 605. If another orbiting body remains to be considered (i.e., "Yes" in subprocess 620), process 600 proceeds to subprocess 630. Otherwise, if all orbiting bodies have been considered (i.e., "No" in subprocess 620), process 600 may end.

In subprocess 630, the path of the current orbiting body under consideration is compared to the path of each orbiting body of interest 605 within the similar window. These paths may be retrieved from output dataset 535, which comprises the predicted path for each orbiting body, as discussed above. In subprocess 630, basic geometry may be used to find the minimum separation between the paths of the two orbiting bodies, using one arc second steps for each predicted path. Alternatively, if the paths are represented as orbit equations, an intersection point between the set of equations for the orbiting bodies may be calculated.

In subprocess 640, it is determined whether or not a conjunction exists between the paths of the two orbiting bodies. A conjunction may be defined as a minimum separation of less than a predefined distance. In an embodiment, this predefined distance is 15 kilometers, which is directly related to an assumed baseline speed of approximately 7 kilometers per second of an orbiting body in low Earth orbit. The position of any conjunction may be recorded as the three-dimensional coordinate representing the mid-point of the conjunction. If a conjunction is determined to exist (i.e., "Yes" in subprocess 640), process 600 may proceed to subprocess 650. Otherwise, if no conjunction is determined to exist (i.e., "No" in subprocess 640), process 600 may return to subprocess 620 to evaluate the next orbiting body or else end.

In subprocess 650, a remedial action may be performed based on the determined conjunction. The remedial action may take any one or more of a plurality of different forms. In a first form, the remedial action may comprise providing an alert to one or more recipients. For example, a notification message may be automatically sent to one or more users of platform 110, such as any user that subscribed to the orbiting body of interest 605 that is involved in the conjunction. The notification message may be sent as an internal message within server application 112 (e.g., appearing in a dashboard of the user's account within a graphical user interface of server application 112 or client application 132), an email message to an email address associated with the user's account, a text message, such as a Short Message Service (SMS) message or Multimedia Messaging Service (MMS) message, to a mobile phone number associated with the user's account, a computer-generated voice message to a phone number associated with the user's account, and/or the like.

In a second form, the remedial action may comprise automatically or semi-automatically (e.g., with user approval) initiating a finer calculation of the paths of the orbiting bodies and potential conjunction to validate (i.e., either confirm or refute) the potential conjunction. It should be understood that such a calculation will generally be more computationally expensive than processes 400-600, in that it requires greater computational resources (e.g., processor speed, processing time, memory, etc.). Such calculations are not feasible for the entire universe of possible conjunctions. Thus, embodiments of processes 400-600 provide coarse conjunction prediction that can be used to filter the universe of possible conjunctions into a manageable number for fine conjunction prediction.

In a third form, the remedial action may comprise automatically or semi-automatically initiating control of a satellite 150, for example, via an external system 140, such as a satellite management system. This control may be performed in response to the determination of a conjunction in subprocess 640, or more preferably, in response to the confirmation of a conjunction by the finer calculation in the second form of remedial action. The control may comprise providing instructions to a C2 system to encode control procedures into an RF link between ground station 142 and satellite 150, to thereby change the orbit of satellite 150. It should be understood that, in this example, satellite 150 is at least one of the orbiting bodies for which a conjunction has been predicted or calculated. Control may be performed for one, two, or more (e.g., if a potential conjunction involves three or more satellites 150) of the orbiting bodies involved in the potential conjunction.

In a fourth form, the remedial action may comprise automatically or semi-automatically packaging a representation of the conjunction, determined in subprocess 640, into an exportable data object (e.g., JSON object). This data object may then be sent or exported to one or more downstream functions on platform 110 and/or external system 140. These downstream function(s) may comprise a visualization tool by which the paths of and conjunction between the two orbiting objects may be visualized, a control system for one or more of the two orbiting objects, an analytical tool or satellite management system associated with a user's account, and/or the like.

4. Visualization

Figure 7:
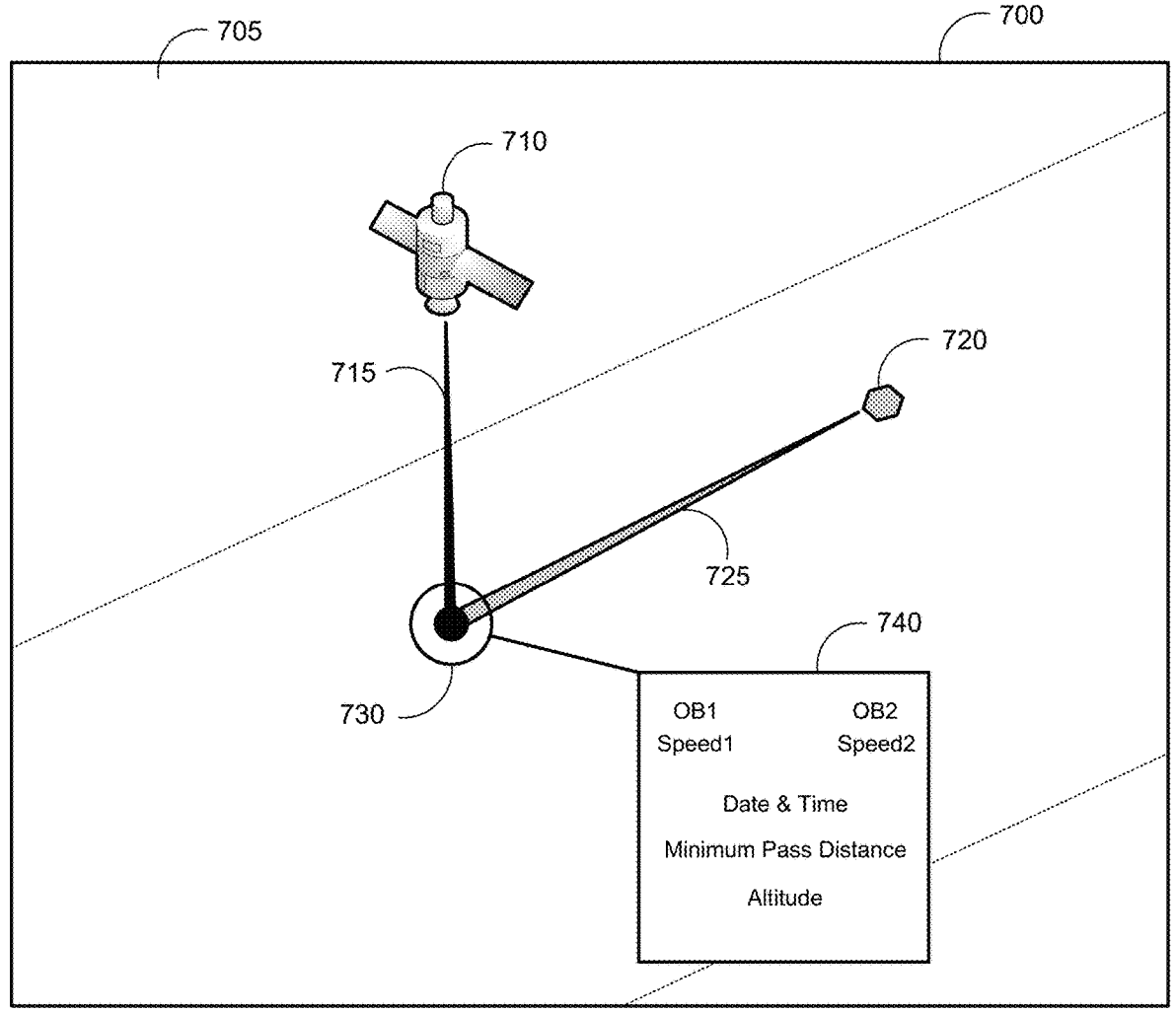
FIG. 7 illustrates an example screen for visualizing a predicted conjunction, according to an embodiment.

FIG. 7 illustrates an example screen 700 for visualizing a predicted conjunction, according to an embodiment. Screen 700 may be provided to a user in a graphical user interface provided by server application 112, or may be provided by a visualization tool of user system 130 or external system 140. Screen 700 provides a visualization of a predicted conjunction that may be generated from a data object (e.g., JSON object) output by process 600, for example, as a form of the remedial action in subprocess 650. The visualization may be generated using any technology, including, for example, the Web Graphics Library (WebGL), the Plotly™ data visualization libraries (e.g., plotly.py for Python, plotly.js for JavaScript, etc.), the Cesium™ platform, the Unreal Engine™, or the like.

Screen 700 illustrates the two orbiting bodies 710 and 720 that are the subject of a predicted conjunction 730, overlaid on a three-dimensional virtual map 705. In this example, first orbiting body 710 is a satellite that is an orbiting body of interest 605, and second orbiting body 720 is debris. Screen 700 illustrates the path 715 from the current position of first orbiting body 710 to predicted conjunction 730 and the path 725 from the current position of second orbiting body 720 to predicted conjunction 730. It should be understood that the length of each path 715 and 725 represents the speed of the respective orbiting body 710 and 720, with a longer path representing a greater speed and a shorter path representing a lower speed.

Predicted conjunction 730 may be associated with an informational frame 740 that comprises details about orbiting bodies 710 and 720 and/or predicted conjunction 730. For example, these details may comprise the speed of each orbiting body 710 and 720, the date and time of predicted conjunction 730 (e.g., Coordinated Universal Time (UTC)), the minimum pass distance, which may also be illustrated by the diameter of the circle representing predicted conjunction 730, the altitude of predicted conjunction 730, and/or the like.

Virtual map 705, which may be hosted by platform 110 or provided by an external system 140 via an API of external system 140, may depict the relevant Earth orbit (e.g., low Earth orbit). Virtual map 705 may provide standard navigational tools to enable a user to view predicted conjunction 730 in three-dimensional space. For example, virtual map 705 may comprise controls that enable rotation of the view in each of three dimensions, as well as panning of the view in any direction. In an embodiment, a plurality of predicted conjunctions 730 may be plotted on the same virtual map 705. For example, all predicted conjunctions 730 for all orbiting bodies of interest 605 to which a given user has subscribed may be plotted on the same virtual map 705.

5. Performance

A state-of-the-art system is able to predict all conjunctions of orbiting bodies greater than or equal to 10 centimeters up to 7 days in advance in about one minute with a ~200-CPU-core supercomputer. See Levit et al., "Improved Orbit Predictions Using Two-Line Elements," Advances in Space Research, vol. 47, no. 7, 2011, pp. 1107-1115. When expanded to orbiting bodies greater than or equal to 2 centimeters, the same system took 40 minutes. Id. A critical problem with this state-of-the-art system is data latency.

Disclosed embodiments may narrow the possible conjunction space (e.g., processes 400-600) using a fast method, before conducting finer conjunction calculations. The utilization of RNN(s) as a pre-loaded predictive model 345 eliminates the 40-minute waiting period, reduces computing time, and enables a better user experience. For example, using a pre-loaded predictive model 345, on a test rig comprising a Ryzen 7 1800X@3.6 GHz CPU, 32 GB DDR RAM@2666 MHz, running a Windows 10 64-bit operating system, prediction times were 0.01 minutes, as opposed to 20 and 720 minutes for 10 and 7,100 training epochs, respectively, for an as-needed model, and 8 and 10 minutes for 10 and 7,100 training epochs, respectively, for a non-pre-loaded model. Using the disclosed embodiments, 30-day forecasting can be completed in less than one minute, which is orders of magnitude faster than the state-of-the-art system. In addition, the LSTM RNN performs significantly better than traditional regression methods.

6. Example Embodiment

In an embodiment, an LSTM RNN is trained as a predictive model 345, as described in process 300, to predict conjunctions, as described in processes 400, 500, and 600. Predictive model 345 is able to predict orbit shape and orientation with high fidelity up to at least 30 days into the future, and for some orbit shape elements, as far out as 7+ months, including over a year.

This provides sufficient warning to complete a more in-depth analysis (e.g., using finer prediction calculations) prior to a potential conjunction. In particular, the disclosed embodiments may allow potential conjunctions to be prioritized for finer in-depth analysis. For example, predicted conjunctions whose epochs are closer to the current time may be prioritized over predicted conjunctions whose epochs are further from the current time. This prioritization of potential conjunctions enables the huge number of orbiting bodies to be properly processed for conjunctions, even as that number continues to grow.

Disclosed embodiments may provide the foundation for a space consortium of inter-connected satellites that are able to adjust their orbits in real time, thereby distributing the fuel expense of on-orbit maneuvers across all satellites on the impacted orbit. When incorporated into an automated or human-approval system to make micro-adjustments to satellites in orbit (e.g., by controlling satellites 150 via ground stations 142, as described elsewhere herein), the cost of adjustments may be shared by all satellite operators and potentially result in smaller orbit corrections and a longer constellation life with respect to fuel load. In addition, this could prevent a Kessler Syndrome event, in which an on-orbit collision creates a chain reaction with other satellites that could make low Earth orbit unusable for some time. Platform 110 may also provide significant situational space awareness (SSA) and enable more efficient utilization of orbit area.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to execute a conjunction-prediction process comprising:
    collecting an input dataset that comprises, for each of a plurality of orbiting bodies, a historical time series of data points, wherein each data point comprises orbit information about the orbiting body at a temporal epoch, wherein the plurality of orbiting bodies comprises all orbiting bodies greater than or equal to 2 centimeters in dimension in low Earth orbit;
    for each of the plurality of orbiting bodies,
        extracting a feature set based on the historical time series for that orbiting body,
        applying a predictive machine-learning model to the extracted feature set to produce an inferred set, wherein the inferred set comprises a predicted future time series of data points, and
        adding the inferred set to an inferred dataset;
    for each inferred set in the inferred dataset,
        applying a gravity model to the inferred set to predict a path, and
        adding the predicted path to an output dataset; and,
    for each of one or more orbiting bodies of interest, identifying whether any of the plurality of orbiting bodies is in a similar window as the orbiting body of interest, and
        when any of the plurality of orbiting bodies is in the similar window, for each of the plurality of orbiting bodies that is in the similar window,
            comparing the predicted paths of that orbiting body and the orbiting body of interest to determine whether or not a potential conjunction occurs, and
            when determining that the potential conjunction occurs, performing at least one remedial action.

2. The method of claim 1, wherein each data point in the historical time series and the future time series is in Two-Line Element (TLE) format.

3. The method of claim 1, wherein the orbit information comprises one or more of an epoch, first time derivative of mean motion, second time derivative of mean motion, a drag term, inclination, right ascension of ascending node, eccentricity, argument of perigee, mean anomaly, mean motion, or revolution number at the epoch.

4. The method of claim 1, wherein each data point in the historical time series and the future time series comprises values for an identical set of fields.

5. The method of claim 1, wherein the future time series comprises at least 30 data points representing 30 consecutive days.

6. The method of claim 1, wherein the predictive machine-learning model comprises a long short-term memory (LSTM) recurrent neural network (RNN).

7. The method of claim 1, further comprising using the at least one hardware processor to:
    generate a training dataset that comprises, for each of the plurality of orbiting bodies, a first historical time series of data points that is labeled with a second historical time series of data points which are subsequent in time to the first historical time series, wherein each data point in the first and second historical time series comprises the orbit information about the orbiting body at a temporal epoch; and
    train the predictive machine-learning model using the generated training dataset.

8. The method of claim 7, wherein generating the training dataset comprises removing a sampling bias in the training dataset by, for each of a plurality of sampling windows, selecting a single data point from the sampling window, and discarding all other data points in the sampling window.

9. The method of claim 8, wherein a size of the sampling window is 24 hours.

10. The method of claim 1, wherein the one or more orbiting bodies of interest comprise the plurality of orbiting bodies.

11. The method of claim 1, further comprising using the at least one hardware processor to receive an input operation, specifying the one or more orbiting bodies of interest, from a user via a graphical user interface, and wherein the at least one remedial action comprises providing a notification of the potential conjunction to the user.

12. The method of claim 1, wherein a potential conjunction is defined as a minimum separation, between the orbiting body and the orbiting body of interest, of less than a predefined distance.

13. The method of claim 1, wherein the at least one remedial action comprises initiating a calculation of a path of the orbiting body and a path of the orbiting body of interest to validate the potential conjunction, wherein the calculation requires greater computational resources than the conjunction-prediction process.

14. The method of claim 1, wherein the at least one remedial action comprises initiating control of one or both of the orbiting body or the orbiting body of interest, via communication with a satellite management system.

15. The method of claim 1, wherein the at least one remedial action comprises packaging a representation of the potential conjunction into a data object, and providing the data object to at least one downstream function.

16. The method of claim 15, wherein the at least one downstream function comprises a visualization tool, and wherein the method further comprises using the at least one hardware processor to execute the visualization tool to:

generate a representation of the potential conjunction on a virtual map;

generate a representation of the orbiting body of interest and a path between the orbiting body of interest and the potential conjunction on the virtual map;

generate a representation of the orbiting body and a path between the orbiting body and the potential conjunction on the virtual map; and generate an informational frame comprising information about the potential conjunction.

17. The method of claim 1, wherein the similar window is defined by a difference in inclination within a predefined range and a difference in altitude within a predefined range.

18. A system comprising:

at least one hardware processor; and one or more software modules that are configured to, when executed by the at least one hardware processor, collect an input dataset that comprises, for each of a plurality of orbiting bodies, a historical time series of data points, wherein each data point comprises orbit information about the orbiting body at a temporal epoch, wherein the plurality of orbiting bodies comprises all orbiting bodies greater than or equal to 2 centimeters in dimension in low Earth orbit, for each of the plurality of orbiting bodies, extract a feature set based on the historical time series for that orbiting body, apply a predictive machine-learning model to the extracted feature set to produce an inferred set, wherein the inferred set comprises a predicted future time series of data points, and add the inferred set to an inferred dataset for each inferred set in the inferred dataset, apply a gravity model to the inferred set to predict a path, and add the predicted path to an output dataset, and, for each of one or more orbiting bodies of interest, identify whether any of the plurality of orbiting bodies is in a similar window as the orbiting body of interest, and when any of the plurality of orbiting bodies is in the similar window, for each of the plurality of orbiting bodies that is in the similar window, compare the predicted paths of that orbiting body and the orbiting body of interest to determine whether or not a potential conjunction occurs, and when determining that the potential conjunction occurs, perform at least one remedial action.

19. A non-transitory computer-readable medium having instructions stored therein, wherein the instructions, when executed by a processor, cause the processor to:

collect an input dataset that comprises, for each of a plurality of orbiting bodies, a historical time series of data points, wherein each data point comprises orbit information about the orbiting body at a temporal epoch, wherein the plurality of orbiting bodies comprises all orbiting bodies greater than or equal to 2 centimeters in dimension in low Earth orbit;

for each of the plurality of orbiting bodies, extract a feature set based on the historical time series for that orbiting body, apply a predictive machine-learning model to the extracted feature set to produce an inferred set, wherein the inferred set comprises a predicted future time series of data points, and add the inferred set to an inferred dataset;

for each inferred set in the inferred dataset, apply a gravity model to the inferred set to predict a path, and add the predicted path to an output dataset; and, for each of one or more orbiting bodies of interest, identify whether any of the plurality of orbiting bodies is in a similar window as the orbiting body of interest, and when any of the plurality of orbiting bodies is in the similar window, for each of the plurality of orbiting bodies that is in the similar window, compare the predicted paths of that orbiting body and the orbiting body of interest to determine whether or not a potential conjunction occurs, and when determining that the potential conjunction occurs, perform at least one remedial action.

\* \* \* \* \*